United States Patent [19]

Malek

[11] Patent Number: 4,712,867
[45] Date of Patent: Dec. 15, 1987

[54] RETROREFLECTOR

[75] Inventor: Fritz J. Malek, Santa Barbara, Calif.

[73] Assignee: Santa Barbara Research Center, Goleta, Calif.

[21] Appl. No.: 817,765

[22] Filed: Jan. 7, 1986

Related U.S. Application Data

[63] Continuation of Ser. No. 473,479, Mar. 9, 1983, abandoned.

[51] Int. Cl.⁴ ............................................. G02B 5/128
[52] U.S. Cl. ..................................... 350/103; 350/109
[58] Field of Search .............................. 350/103–106, 350/109

[56] References Cited

U.S. PATENT DOCUMENTS

| | | | |
|---|---|---|---|
| 1,671,086 | 5/1938 | Stimson | 350/103 |
| 3,830,682 | 8/1974 | Rowland | 350/109 |
| 3,836,226 | 9/1974 | Cechetini | 350/105 |
| 3,851,947 | 12/1974 | Montgomery | 350/109 |
| 3,989,775 | 11/1976 | Jack et al. | 350/105 |
| 4,066,331 | 1/1978 | Lindner | 350/109 |

FOREIGN PATENT DOCUMENTS

| | | | |
|---|---|---|---|
| 1020520 | 11/1952 | France | 350/109 |
| 456398 | 11/1936 | United Kingdom | 350/106 |
| 1107799 | 3/1968 | United Kingdom | 350/105 |

Primary Examiner—John K. Corbin
Assistant Examiner—Loha Ben
Attorney, Agent, or Firm—Ronald L. Taylor; A. W. Karambelas

[57] ABSTRACT

Retroreflector (10) has a base (12) with an even back surface (24) and an uneven forward surface (14). The uneven forward surface is illustrated as grooved with one of the grooves shown at (22) with groove sides (30) and (32). The uneven forward surface (14) is coated with retroreflector elements (16) so that incident light from almost 90° to the normal is retroreflected.

3 Claims, 8 Drawing Figures

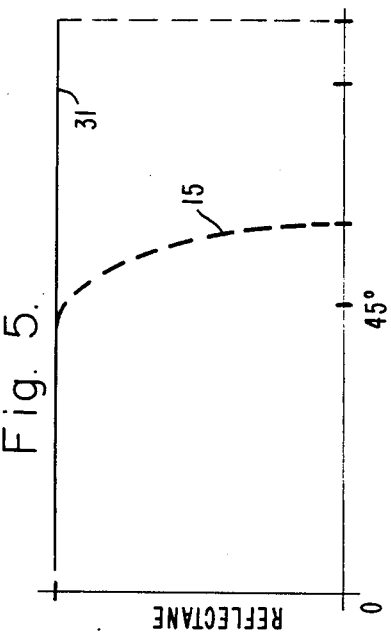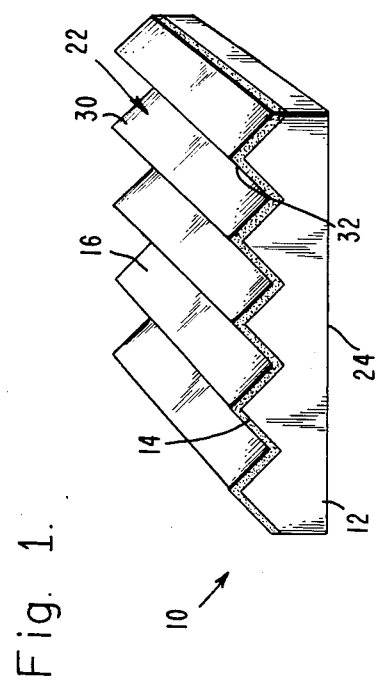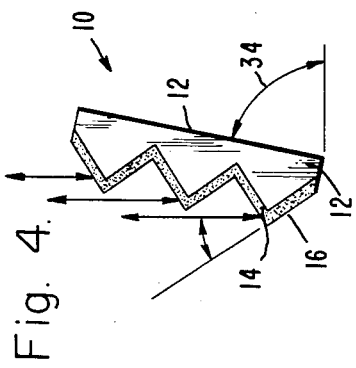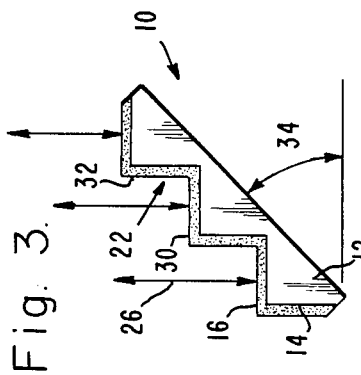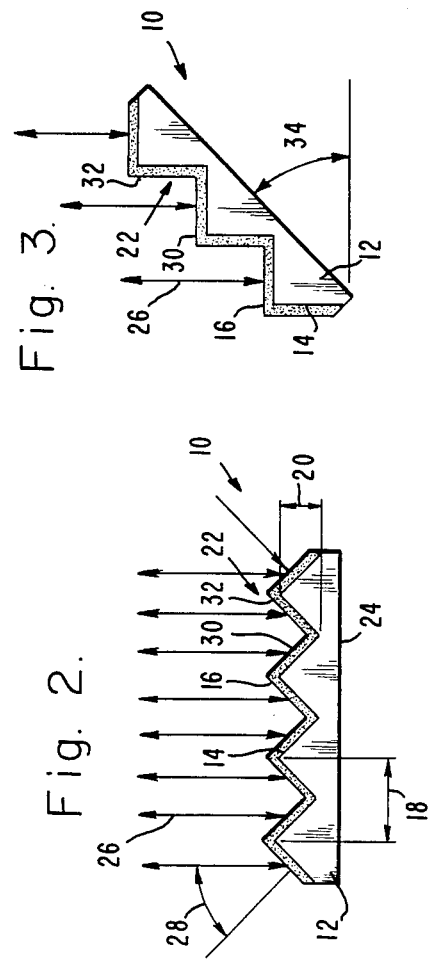

RETROREFLECTOR

The government has rights to this invention pursuant to Contract No. FO-8635-81-C-0133 awarded by the Department of the Air Force.

This application is a continuation of application Ser. No. 473,479, filed Mar. 9, 1983 now abandoned.

TECHNICAL FIELD

This invention is directed to a retroflector for retroflecting light over a wide range of incident angles.

BACKGROUND OF THE INVENTION

Large area optical retroreflectors are sometimes made of small glass spheres embedded in epoxy, and oftentimes just bonded to a carrier by means of this epoxy. These retroreflectors are usually available as generally planar tapes or sheets with adhesive backing. The retroreflective properties of such tapes are such that they reflect incident radiation back within a very small angular range around the direction of incidence. Such retroreflectors are very efficient and have a high reflectance in the direction of the irradiating source while in other directions very little radiation is scattered. One problem with these retroreflectors is that their efficiency of reflectance is dependent on the angle of the incoming rays with respect to the normal to the nominal reflector surface. Once a critical angle is exceeded, the reflectance substantially decreases. A typical glass sphere retroreflector has almost unchanged reflectance out to about 45° from the normal to the reflector surface but drops quickly to very low values beyond that angle. Thus, such retroreflectors are not useful when the incident light is expected to come from a source which may be at a wide angle from the normal. Accordingly, there is need for reflectors which are efficient over a wide angular range of incident radiation.

SUMMARY OF THE INVENTION

In order to aid in the understanding of this invention it can be stated in essentially summary form that it is directed to a retroreflector which is efficient over a wide range of incident radiation. This is accomplished by evenly depositing the reflector material on a forward surface which is other than flat.

It is thus a purpose and advantage of this invention to provide a retroreflector which is useful over a wide range of angles of incident radiation, so as to reflect back to the source a substantial amount of the incident energy, even over a wide range of incident angles.

It is another purpose and advantage of this invention to provide a reflector which is effective over large areas and is capable of efficient retroreflection over a wide range of angles of incidence wherein the support for the reflective surface is out of planar so that different areas of the reflector are directed in different directions to achieve efficient retroreflection over a wide range of incident angles.

BRIEF DESCRIPTION OF THE DRAWINGS

FIG. 1 is a perspective view of a first preferred embodiment of the retroreflector of this invention.

FIGS. 2, 3 and 4 show the retroreflector of FIG. 1 operating at different incident angles.

FIG. 5 is a graph showing the reflectance of both the prior art retroreflector structures and the reflectance of the retroreflector of this invention, versus angles of incidence.

DETAILED DESCRIPTION OF THE INVENTION

Figure 7:
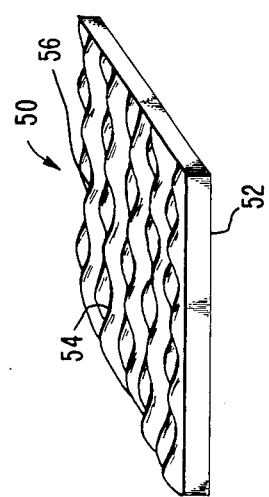
FIG. 7 is a perspective view of another preferred embodiment of the retroreflector of this invention.

The first preferred embodiment of the retroreflector of this invention is generally indicated at 10 in FIGS. 1, 2, 3 and 4. The retroreflector 10 has a base 12 with a forward surface 14 which carries a plurality of reflector elements 16. In the preferred embodiment, the reflector elements comprise a plurality of small glass spheres evenly embedded in epoxy or similar polymer material. In other embodiments the small glass spheres may be bonded onto the surface. The small glass spheres are designed to have a retroreflective property such that they reflect incident radiation back toward the light source, within a very small angular range. The index of refraction and the radius of the glass spheres are matched to internally focus the rays to maximize the retroreflective property. Therefore, the glass spheres are very efficient and have a high reflectance in the direction of the source. In other directions, very little of the incoming radiation is scattered. Other kinds of retroreflector material which can be applied to a non-flat surface could be used. When the incoming radiation is of a large angle normal to the surface on which the reflector elements are secured, reflection back to the source decreases. In the typical retroreflector, of the kind described herein, the retroreflection back to the source is almost unchanged until the incident radiation is greater than about 45° to the surface. The reflectance back to the source drops to very low values beyond this angle. This decrease in reflectance is shown by line 15 in FIG. 5.

In accordance with this invention, this problem is overcome by providing a forward surface 14 which is other than substantially planar. In the first preferred embodiment shown in FIGS. 1, 2, 3 and 4, the forward surface 14 is not planar. It is shown as having a plurality of V-shaped grooves seen in end view in FIG. 2. The grooves have a pitch, spacing or period identified by the distance 18. The grooves have a height or amplitude identified by the dimension 20. One of the grooves is identified by the reference character 22. The grooves are illustrated as having a 90° total included angle between the groove walls, and with those walls aligned equally on each side of the normal to the back 24 of the base. That structure is the preferred embodiment and is the smallest practical angle. Total included angles over 90° up to 135° are useful. The maximum total included is chosen depending on the angle vs. reflectance properties of the material chosen. For retroreflective spheres a maximum total included angle of about 135° appears to be the outer limit. Each of the grooves forms a zone of reflecting zone surface which has a different normal than adjacent surfaces to have a different effective retroreflective cone. When the groove walls are at 45°, with respect to the incident radiation 26, as illustrated by the angle 28 in FIG. 2, then the height 20 is twice the spacing 18.

With the two sides 30 and 32 arranged at right angles to each other, it is seen that as the angle of the retroreflector 10 changes to present the retroreflector at an angle to the incident radiation at a value other than normal, one of the sides 30 and 32 has an increasing local angle to the incident radiation while the other has a decreasing angle. At the 45° position shown in FIG. 3, the incident radiation 26 is normal to the groove side 30 while the groove side 32 is completely unilluminated and is not reflective. Thus, full retroreflection from the surface 30 is achieved up to the 45° angle shown in FIG. 3. Beyond that angle, some of the surface of groove side 30 is shaded as indicated in FIG. 4. Thus, as the angle 34 increases above 45° the total reflected energy decreases according to the cosine law. The reflectance does not decrease because it is dependent on the characteristics of the material and the angle. The reflectance is shown by line 31 in FIG. 5.

Figure 6:
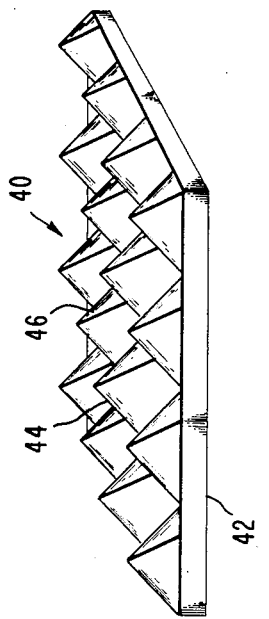
FIG. 6 is a perspective view of a second preferred embodiment of the retroreflector of this invention.

The forward surface of the base carrying the reflector elements need not be of uniform grooves as illustrated in the first preferred embodiment 10, but the surface can be of other non-planar configuration. The surface upon which the reflector elements is laid down may be wavy like corrugated sheet metal or grooved like a Whitworth thread. On the other hand, it may have a surface shaped like a waffle or a plurality of pyramids, or any non-planar surface which offers at least some fraction of its area to the incoming radiation at an angle of incidence smaller than the angle at which the incidence to the normal plane rapidly begins to diminish. Retroreflector 40 shown in FIG. 6 has a base 42 carrying a front surface 44 which is configured as a plurality of closely adjacent pyramids, in this case the pyramids have square bases and an interior total included angle between opposite faces of 90°. In this way, the adjacent faces of adjacent pyramids lie at 90° with respect to each other. As in retroreflector 10, the total included angle may be up to 135°, depending on the material. The front surface 44 is coated with a plurality of retroreflector elements 46 in an adhesive base as previously described. Similarly to the retroreflector 10, a portion of the retroreflectors remain visible and at an angle such that the normal to the reflector surface is less than 45° to the incident radiation, until the reflective surfaces are substantially shadowed by adjacent pyramids.

Retroreflector 50, illustrated in FIG. 7, has a base 52 which has an uneven surface 54 on which retroreflector elements 96 are adhesively secured as previously described. The uneven surface 54 is in the form of a series of waves with curved top surfaces. They are configured as if a group of solid cylinders of uniform diameter were longitudinally configured into sine waves. The adjacent such structures are positioned on opposite cycles, and the entire lower portion of the structure adjacent the base melded and rounded together so that no angle is greater than 45° to the back of the base. Such a structure is wavy in both directions on different pitches and with no surface steeper to the base than 45°. When coated with the retroreflector elements, it serves in the same way as the retroreflectors 10 and 40.

Figure 8:
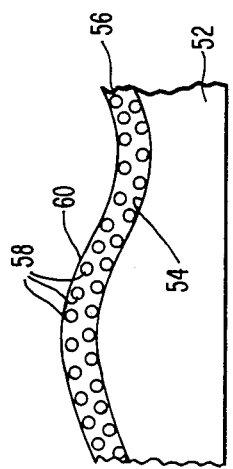
FIG. 8 is a partial cross sectional view of the retroreflector shown in FIG. 7 wherein the glass spheres making up the retroreflective coating on the base are shown in exaggerated size.

FIG. 8 illustrates the coating of glass spheres 58 suspended in polymeric material 60 which make up the retroreflective elements 56.

The retroreflector of this invention has an uneven forward surface wherein a portion of the forward surface is positioned at an angle no more acute than 90° to any other portion of the surface. With the smooth curves of the retrorefletor 50, the relative angles are continuously changing between the surfaces so that the angles between normals to the surface vary from 0° to no more than 90°. With those normals pointed in different directions, and limited to no more than 45° on either side of the normal to the back of the base, incident radiation up to 90° from the normal to the back of the base can be efficiently reflected. The above mentioned forward surface of the base can be alternatively described as being formed as a plurality of sinuous rods of circular section aligned and lying adjacent to each other so that adjacent such rods are in different sinusoidal cycle positions so aligned, the rods blending smoothly with the base. The normals to all of the surfaces of the rods lie no more than 90° from each other and lie no more than 45° from the normal to the back of the base.

This invention has been disclosed in its presently contemplated best mode and it is clear that it is susceptible to numerous modifications, mode and embodiments within the ability of those skilled in the art and without the exercise of the inventive faculty. Accordingly, the scope of this invention is defined by the scope of the following claims.

What is claimed is:

1. A retroreflector for reflecting radiation over a wide range of incident angles, said retroreflector comprising:

a nonreflective base having a back surface and a forward surface, said forward surface comprising a series of adjacent wavy columns having alternately disposed hills and valleys running longitudinally on said base, each column having rounded top faces extending in all directions as well as rounded lower portions, laterally adjacent columns being offset such that the valleys of a given column are bounded laterally by hills of adjacent columns;

adjacent faces in different columns blending smoothly into each other and being arranged so that lines normal to said adjacent faces define angles of less than 90 degrees with respect to each other, with lines normal to all faces in the forward surface defining an angle of less than 45 degrees with respect to a line normal to the back surface; and a substantially uniform coating of retroreflective elements in the form of glass spheres suspended in a polymeric material secured substantially throughout and covering the entirety of the forward surface of the base whereby incident radiation up to 90 degrees from said normal to the back surface can be retroreflected.

2. The retroreflector of claim 1 wherein the polymeric material is epoxy.

3. The retroreflector of claim 1 wherein said coating is adhesively secured to the forward surface of the base.

* * * * *